April 13, 1926.
F. R. HAHN
1,580,485
MOLD
Filed June 5, 1924     4 Sheets-Sheet 1
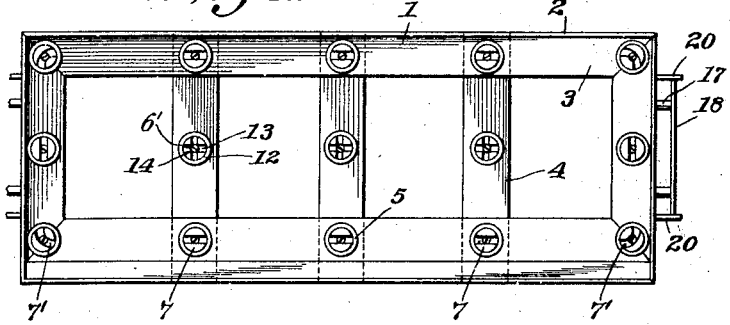
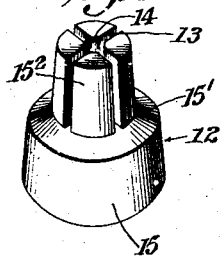
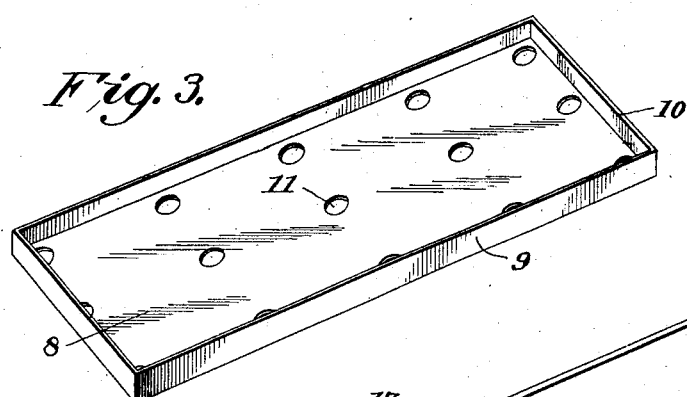
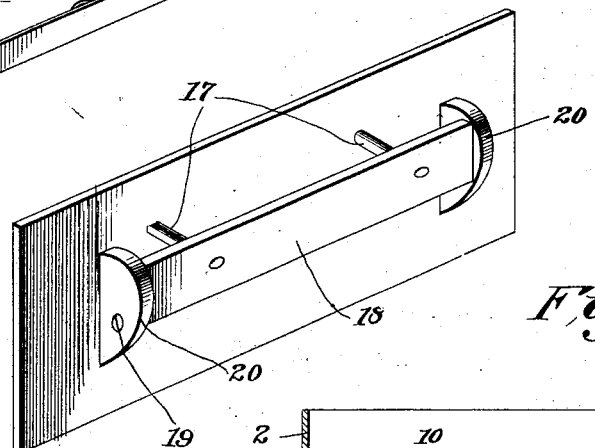
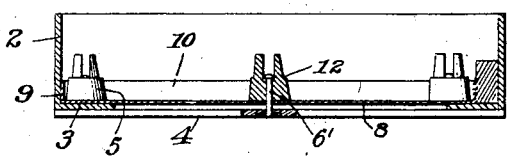
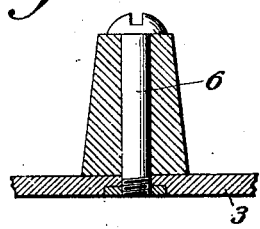
Inventor
Frank R. Hahn,
By George Q. Bean
Attorney April 13, 1926. 1,580,485
F. R. HAHN
MOLD
Filed June 5, 1924 4 Sheets-Sheet 2
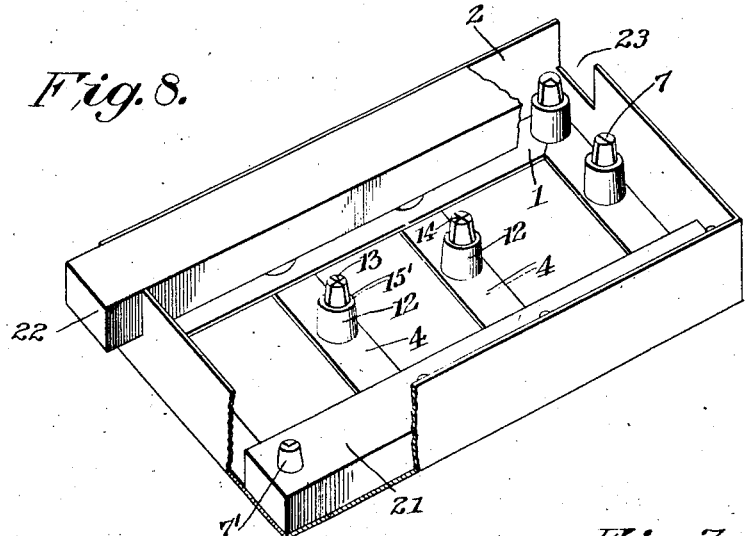
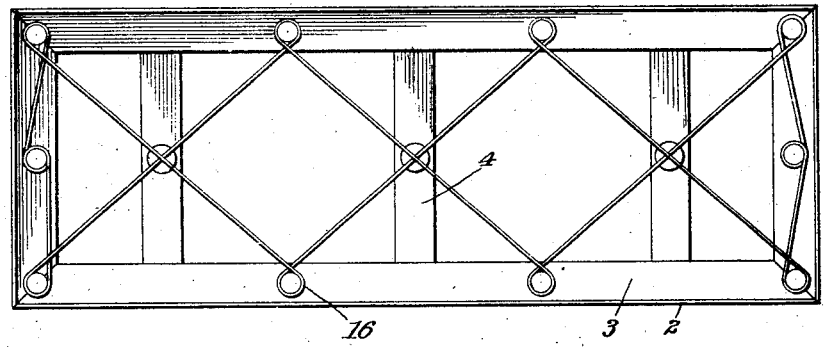
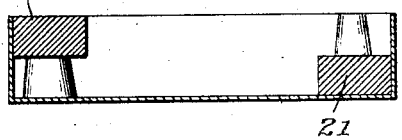
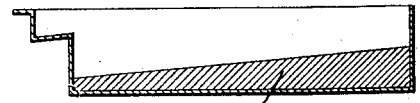
Inventor
Frank R. Hahn,
By George Q. Bean
Attorney April 13, 1926.  1,580,485

F. R. HAHN

MOLD

Filed June 5, 1924   4 Sheets-Sheet 3

Inventor
Frank R. Hahn,
By George L. Bean
Attorney

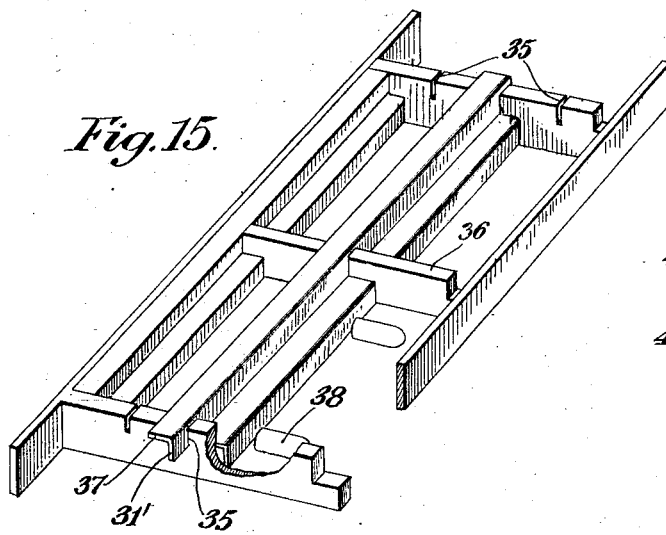
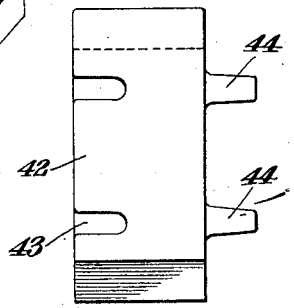
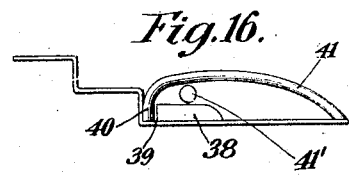
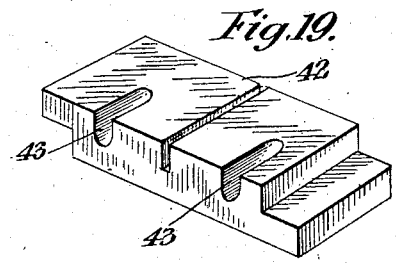
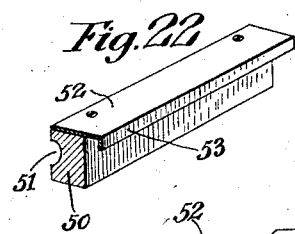
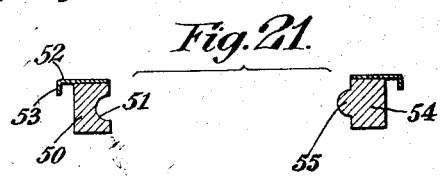
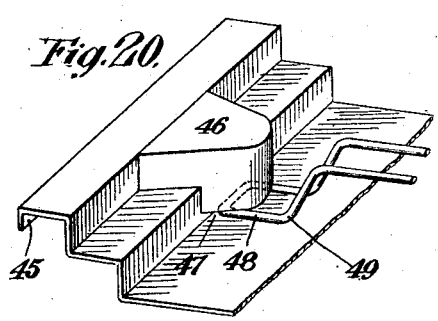

Patented Apr. 13, 1926.

1,580,485

UNITED STATES PATENT OFFICE.

FRANK R. HAHN, OF DECATUR, ILLINOIS.

MOLD.

Application filed June 5, 1924. Serial No. 717,974.

*To all whom it may concern:*

Be it known that I, FRANK R. HAHN, a citizen of the United States, a resident of Decatur, in the county of Macon and State of Illinois, have invented a certain new and useful Mold, of which the following is a specification.

This invention relates to improvements in molds, particularly for forming building units or blocks of cement, concrete, or other suitable plastic material.

The principal object of this invention is the provision of such a construction which is simple and strong, and which may be operated quickly and expeditiously, and at a minimum expense to turn out blocks or units of various kinds and ornamented in various ways.

A further object is the provision of such a mold which will readily cast blocks provided with proper reinforcements and also means exposed along the edge to receive securing and attaching means.

Another object of this invention is the provision of such a mold with various forms of attachments whereby units of various shapes, sizes, and construction may be readily and quickly made, the adaptation of the mold for these purposes being accomplished with a minimum amount of work and time.

To the accomplishment of these, as well as other objects, this invention includes the combination and arrangement of parts hereinafter described and then defined in the appended claims, reference being had to the accompanying drawings, forming a part hereof, and which show for the purpose of illustrative disclosure certain embodiments of this invention, it being expressly understood, however, that various changes may be made in practice within the scope of the claims without digressing from my invention.

Figure 1 represents a top plan view of the main frame or body of the mold constructed according to my invention.

Figure 2 represents a transverse cross section of the same, the false bottom, however, being shown in position.

Figure 3 is a view in perspective of one form of the false bottom.

Figure 4 is a perspective view of one end of the mold showing the pins for forming openings in the end of the unit and the means for operating the same.

Figure 5 is a perspective view of one form of cut-out and anchorage member.

Figure 6 is a vertical cross section of another form of cut-out and anchorage member.

Figure 7 is a diagrammatic top plan view of the main frame or body showing one manner of arranging the metallic reinforcement for the block.

Figure 8 is a perspective view of the main frame or body of the mold having upper and lower cut-outs for providing lap joints.

Figure 9 is a transverse cross section of Figure 8.

Figure 11 is a transverse cross section of one form of false bottom to form a ship lap building unit.

Figure 15 is a perspective view of the mold showing a longitudinal insert in position therein for forming units less in width than the width of the mold proper and having a different form of cut-out member adapted to expose a loop or eye in the edge of the unit.

Figure 16 is a diagrammatic and elevational view indicating the position of the longitudinal reinforcement and of the transverse reinforcement, the loop of which is exposed to form the securing eye.

Figure 17 is a perspective view of the transverse reinforcement itself.

Figure 18 is a top plan view of a transverse insert for forming units less in length than the length of the mold.

Figure 19 is a perspective view thereof.

Figure 12:
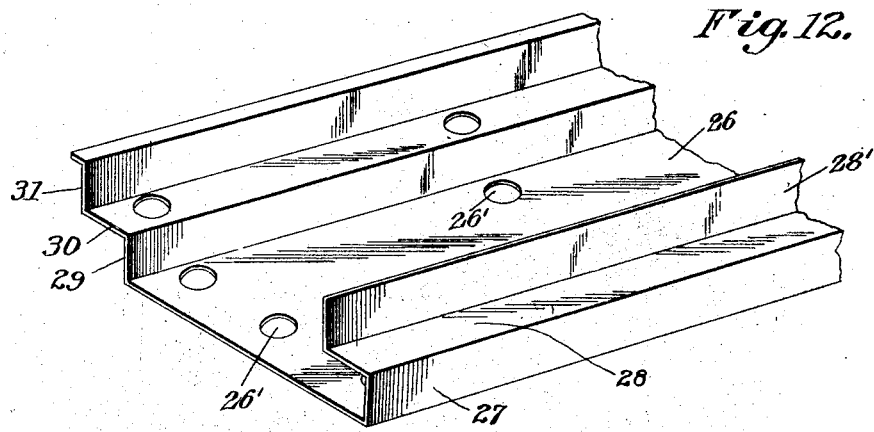
Figure 12 is a perspective view of another form of false bottom adapted to form the same unit as formed by the construction of Figure 8.

Figure 20 a perspective view of another form of false bottom showing a different form of cut-out and anchorage member cooperating with a slightly different form of transverse reinforcement.

Figure 21 is a transverse cross-section of a pair of the complemental inserts to be used in the molds for forming the tongues and grooves in the units.

Figure 22 is a perspective view of the element shown at the left in Figure 21.

Referring now to the drawings, the numeral 1 designates the main frame or body of the mold. This is preferably of general rectangular shape and made of suitable material, preferably angle steel, having the side flanges 2 and the bottom flanges 3. This forms a skeleton frame which is spanned by the transverse strap members 4. Secured to the bottom flanges 3 at suitable intervals therearound are the conical-shaped cut-out members 5 which are preferably held in place by means of the bolt and nut construction 6. These cut-out members provide means for forming openings or recesses in the units cast therein and also provide anchorages for receiving the reinforcing means which may be looped therearound, or said members may be provided with straight slots 7 for the sides and curved slots 7' for the corners to receive the reinforcing means.

A false bottom 8 is utilized in the mold, this being of the same general shape as the main frame or body and being provided with vertical side flanges 9 and vertical end flanges 10. The latter may be omitted if desired. This false bottom 8 fits tightly in the main frame of the mold and is provided with a plurality of openings 11 to fit over the cut-out members 5 previously described.

In addition to the cut-out and anchorage members previously described, a plurality of central cut-out and anchorage members 12 are utilized, these being positioned on the transverse members 4 as shown. They are each in the form of a conical element tapering upwardly and provided with crossed slots 13 which have a rounded opening 14 leading thereto. These members 12 are secured in position by means of the bolt or rivet construction 6'. Each of the cut-out and anchorage members may be adjusted or moved upon its axis so as to change the direction of the slots 7, 7', or 13, as the case may be. As shown in Figure 6, these members may be of general conical formation, or as shown in Figure 5, they may be of a double frustro conical formation, that is, having the lower enlarged part 15 terminating in the upper shoulder 15' and leading to the upper and reduced frustro conical part $15^2$. This provides a very effective method of holding the looped reinforcing members which will rest on the shoulder 15' when placed in position prior to casting the cement.

In molding, the false bottom is placed in position and the reinforcing means which is in the form of a wire or pliable rod is placed in the mold and about the cut-out and anchorage members as desired. If it is desired to have the same assume a zigzag construction as shown in Figure 7, the intermediate parts cross each other and are positioned in the intermediate cut-out and anchorage members as shown there. This Figure 7 of the drawing discloses the shape of the reinforcement in this form of block, having the reinforcing loops or eyes 16 which surround the loops or eyes formed in the completed block by the cut-out members 5 and 12. This reinforcement may be made on a separate form and then placed in position in the mold if desired, although this is not necessary.

In the event it is desired to provide means in the units whereby the same may be properly aligned in the constructing operation, I provide a plurality of pins 17 which are arranged to project through one of the end walls of the mold, being secured to a plate 18 which is pivotally mounted as by means of pintles 19 between the two extending flanges 20 (see Figures 1 and 4 of the drawing particularly). It is to be understood that by forcing the pins inwardly when the cement is wet and before it is set apertures are made in the ends of the block within the mold. Pins or other projections (not shown) may be positioned in these apertures in one end of the block so as to engage the corresponding apertures in the other end of the adjacent blocks. Of course, these pins are withdrawn before the mold is removed from the block. Or the longitudinal reinforcing members may be extended through the mold and one end rest in slots or holes in the end wall or flange of the mold to form projecting pins to fit the apertures just referred to in the completed block.

In order to form units having overlapping parts, I provide inserts 21 and 22 as illustrated in Figures 8 and 9 of the drawing, the former resting on the bottom of the mold and having apertures to receive cut-out members 5. The other insert 22 is positioned at the other side of the mold above the cut-out members 5 and resting in the cut-out parts 23 of the vertical flanges of the mold. It may extend beyond the end of the same as shown (Figure 8) to permit ready removal therefrom. It is obvious that this form of mold will provide blocks having oppositely disposed flanges which will overlap when erected in a structure. It is to be understood that inserts similar to 21 and 22 may be used for the ends of the units so that they can interlock or overlap as desired, and also that the pin 17 may be provided on the sides of the mold as well as on the ends so as to form apertures in these parts of the units.

Figure 10:
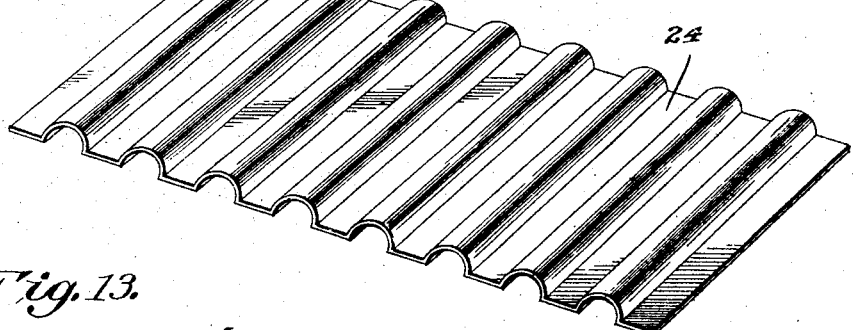
Figure 10 is a perspective view of another form of false bottom or insert for providing a ribbed or corrugated faced unit.

It is also to be understood that in this mold various kinds of ornamental plates or false bottoms may be utilized. A corrugated form is illustrated in Figure 10 of the drawing and designated by the reference character 24. Another form is shown in Figure 11 of the drawing and designated by the reference character 25, this form being utilized to produce the clapboard construction.

I also provide a false bottom 26, shown in Figure 12, which will produce the same result as the mold shown with the inserts 21 and 22, this false bottom having the vertical flange 27 which is formed with the inwardly extending horizontal flange or projection 28 and vertical flange 28' along the inside thereof to form the upper cut-out. On the other side it has the shorter vertical flange 29, the right-angled horizontally and outwardly extending flange 30, and another vertical flange 31, which provide the lower cut-out. This false bottom is formed with apertures 26' to receive the cut-out and anchorage members 5 and 12.

Figure 13:
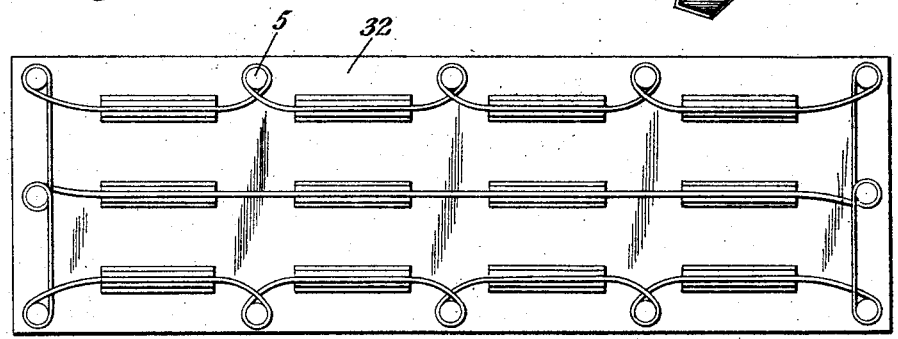
Figure 13 is a top plan view of another form of false bottom and cut-out and anchorage members to provide for the making of units in which the reinforcing means is exposed and apertures provided entirely through the unit for securing, ventilating, and providing an anchorage for the plaster and other purposes.
Figure 14:
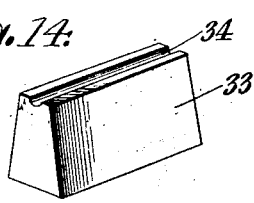
Figure 14 is a perspective view of another form of cut-out and anchorage member.

In Figures 13 and 14 I illustrate the method of forming a block which has the reinforcement exposed in apertures extending entirely through the block, whereby the same may be readily secured in position and the block ventilated and also a suitable anchorage provided for plastering. In these figures, 32 designates the false bottom and 33 the particular form of cut-out and anchorage member utilized. Of course, proper slots or openings are provided in the false bottom to receive each member, 33 which is in the form of a truncated pyramid having the groove 34 provided in its upper surface to receive the reinforcement which is arranged as shown in Figure 13.

The construction of the false bottom illustrated in Figure 15 is substantially the same as that shown in Figure 12, with the exception that the flange 31 of Figure 12 is extended longitudinally as at 31' to fit within a slot 35 which is formed either in the end of the mold or in a divider member 36, the extended horizontal flange 37 resting on top thereof whereby the false bottom is securely held in position within the mold.

In connection with this form of false bottom I provide a different form of cut-out member 38 which terminates short of the first vertical flange 29 to provide a space 39 to receive the loop 40 of the transverse reinforcing member 41. This is of the shape shown in Figure 17 and the curved part is positioned over the longitudinal reinforcement 41' as shown particularly in Figure 16. It is understood that this construction forms a longitudinal dividing medium whereby units of various widths may be readily provided in a mold of standard size.

In order to provide units of various lengths I furnish the transverse dividing mediums 42 shown in Figures 18 and 19. These have the grooves 43 on one side to receive the ends of the longitudinal reinforcements and the projections 44 on the other side to form the openings or sockets in the ends of the units for interlocking purposes as previously described. The ends of these dividing elements may be shaped according to the shape of the mold or the shape of the inserts, those shown in the drawings being shaped to provide lap joints.

Figure 20 illustrates another form of insert or false bottom which is similar to the one shown in Figure 12 and also in Figure 15 with the addition of a further downwardly depending flange 45 for fitting the side edge of the mold to securely hold the same in position. This form utilizes a different shaped cut-out member 46 which may be formed of wood or other suitable material and of any desired shape. As shown, it is spaced from the bottom of the insert as at 47 to receive the loop 48 of the transverse reinforcement 49. This loop is therefore exposed at one edge in the completed unit and is used for securing purposes.

These are merely mentioned as a few of several attachments that may be employed in connection with this mold, and it is to be understood that numerous others may be used to accomplish different and varied results.

The false bottom fits tight and when the molding operation is completed and the article set sufficiently to retain its shape, the mold is turned upside down and the outer frame or body is removed, the cut-out mediums or lugs which are secured thereto readily withdrawing owing to their conical shape, and the false bottom is released and will spring outwardly sufficient to disengage from the product in the mold.

Another feature of this invention is the provision of means for molding the units with tongues and grooves in the opposite sides or ends of the same so that when erected the adjacent units will interfit. Certain forms of such means are illustrated in Figures 21 and 22, of the drawing. There the insert 50 is provided with a groove 51 therein and is adapted to be positioned along the inside of the mold either at the sides or ends or both and will be held in position by means of the holding flange member 52 having the downward depending extremital flange 53 which overlaps the edge of the mold. This will form a corresponding rib or tongue in the unit. The corresponding member 54 is provided with a rib or tongue 55 so as to form a groove in the opposite side or end of the unit. These parts may be inserted separately in the mold and when the material is cast therein will leave the mold with the material when it is discharged therefrom and then may be readily separated from the unit and used over again.

What I claim is:—

1. A mold of the character described including a main frame or body having vertically extending flanges entirely therearound, cut-out and reinforcement supporting means mounted therein, a false bottom inserted in said mold and having apertures to fit over said cut-out and reinforcement supporting means, said false bottom being frictionally supported within said frame or body.

2. A mold of the character described including a main frame or body having vertically extending flanges entirely therearound, cut-out and reinforcement supporting means mounted therein, a false bottom inserted in said mold and having apertures to fit over said cut-out and reinforcement supporting means, said false bottom being frictionally supported with said frame or body, and having vertical flanges on certain of its sides.

3. A mold of the character described including a main frame or body having vertically extending flanges entirely therearound, cut-out and reinforcement supporting means mounted therein, a false bottom inserted in said mold and having apertures to fit over said cut-out and reinforcement supporting means, said false bottom being frictionally supported within said frame or body, said cut-out and reinforcement supporting means being of conical shape and arranged to form cut-outs in the edges of the block cast in the mold.

4. A mold of the character described including a main frame or body having vertically extending flanges entirely therearound, cut-out and reinforcement supporting means mounted therein, a false bottom inserted in said mold and having apertures to fit over said cut-out and reinforcement supporting means, said false bottom being frictionally supported within said frame or body, said cut-out and reinforcement supporting means being of conical shape and arranged to form cut-outs in the edges of the block cast in the mold, and additional cut-out and reinforcement supporting members arranged in a medial position.

5. A mold of the character described including a main frame or body having vertically extending flanges entirely therearound, cut-out and reinforcement supporting means mounted therein, a false bottom inserted in said mold and having apertures to fit over said cut-out and reinforcement supporting means, said false bottom being frictionally supported within said frame or body, said cut-out and reinforcement supporting means being of conical shape and arranged to form cut-outs in the edges of the block cast in the mold, and additional cut-out and reinforcement supporting members arranged in a medial position, said additional members being formed with slots to receive the reinforcement means.

6. A mold of the character described including a main frame or body having vertically extending flanges entirely therearound, cut-out and reinforcement supporting means mounted therein, a false bottom inserted in said mold and having apertures to fit over said cut-out and reinforcement supporting means, said false bottom being frictionally supported within said frame or body, said cut-out and reinforcement supporting means being of conical shape and arranged to form cut-outs in the edges of the block cast in the mold, and additional cut-out and reinforcement supporting members arranged in a medial position, said additional members being formed with slots to receive the reinforcement means, all of said cut-out and reinforcement supporting means being arranged so as to provide a zigzag and criss-cross arrangement of the reinforcing means within the mold.

7. A mold of the character described including a main frame or body having vertically extending flanges entirely therearound, cut-out and reinforcement supporting means mounted therein, a false bottom inserted in said mold and having apertures to fit over said cut-out and reinforcement supporting means, said false bottom being frictionally supported within said frame or body, and longitudinally extending cut-out means arranged along the sides of the mold.

8. A mold of the character described including a main frame or body having vertically extending flanges entirely therearound, cut-out and reinforcement supporting means mounted therein, a false bottom inserted in said mold and having apertures to fit over said cut-out and reinforcement supporting means, said false bottom being frictionally supported within said frame or body, and longitudinally extending cut-out means arranged along the sides of the mold, part of the flanges of the main frame or body of the mold being cut away to support one of said longitudinally extending cut-out means in spaced relation to the bottom of the mold, the other longitudinally extending cut-out means being positioned on the bottom of the mold.

9. A mold of the character described including a main frame or body having vertically extending flanges entirely therearound, cut-out and reinforcement supporting means mounted therein, a false bottom inserted in said mold and having apertures to fit over said cut-out and reinforcement supporting means, said false bottom being frictionally supported within said frame or body, certain of the flanges of the main frame or body of the mold being provided with movable pins adapted to form sockets or holes in the unit cast in the mold and means for inserting and withdrawing said pins.

10. A mold of the character described including a main frame or body having vertically extending flanges entirely therearound, cut-out and reinforcement supporting means mounted therein, a false bottom inserted in said mold and having apertures to fit over said cut-out and reinforcement supporting means, said false bottom being frictionally supported within said frame or body, certain of the flanges of the main frame or body of the mold being provided with movable pins adapted to form sockets or holes in the unit cast in the mold and means for inserting and withdrawing said pins, said means including a plate to which the pins are secured, outwardly extending flange members secured to the flange of the main frame or body, said plate being pivotally supported between said flange members.

11. A false bottom for a mold for plastic units including a flat bottom portion, a vertically extending flange along one side provided at the top with a longitudinally extending enlargement to extend within the mold and form a cut-out portion in the block, a shorter vertical flange on the other side of the false bottom, a horizontal flange communicating therewith and another vertical flange communicating with said horizontal flange so as to form a longitudinally extending cut-out portion in the end side of the block to be formed in the mold.

12. A mold for forming a building unit of plastic material having reinforcements and exposed means to receive securing and attaching devices including a main frame or body in the form of a skeleton frame having vertically extending flanges entirely therearound, bottom flanges and transverse strap members connecting said bottom flanges, cut-out and reinforcement supporting means mounted on said bottom flanges and said transverse strap members, a false bottom inserted in said mold and having apertures to fit over said cut-out and reinforcement supporting means, said false bottom being frictionally supported within said frame or body.

13. A mold for forming a building unit of plastic material having reinforcements and exposed means to receive securing and attaching devices including a main frame or body in the form of a skeleton frame having vertically extending flanges entirely therearound, bottom flanges and transverse strap members connecting said bottom flanges, cut-out and reinforcement supporting means mounted on said bottom flanges and said transverse strap members, a false bottom inserted in said mold and having apertures to fit over said cut-out and reinforcement supporting means, said false bottom being frictionally supported within said frame or body, said cut-out and reinforcement supporting means being of conical shape to form cut-outs in the edges of the block cast in the mold.

14. A mold for forming a building unit of plastic material having reinforcements and exposed means to receive securing and attaching devices including a main frame or body in the form of a skeleton frame having vertically extending flanges entirely therearound, bottom flanges and transverse strap members connecting said bottom flanges, cut-out and reinforcement supporting means mounted on said bottom flanges and said transverse strap members, a false bottom inserted in said mold and having apertures to fit over said cut-out and reinforcement supporting means, said false bottom being frictionally supported within said frame or body, said cut-out and reinforcement supporting means being of conical shape to form cut-outs in the edges of the block cast in the mold and having slots to receive the reinforcing means, said cut-out and reinforcement supporting members being arranged so as to provide a zig-zag and criss-cross arrangement of the reinforcing means within the mold.

15. A mold for forming a building unit of plastic material having reinforcements and exposed means to receive securing and attaching devices including a main frame or body in the form of a skeleton frame having vertically extending flanges entirely therearound, bottom flanges and transverse strap members connecting said bottom flanges, cut-out and reinforcement supporting means mounted on said bottom flanges and said transverse strap members, a false bottom inserted in said mold and having apertures to fit over said cut-out and reinforcement supporting means, said false bottom being frictionally supported within said frame or body, and movable aperture making pins mounted on one of the flanges of said main frame or body.

FRANK R. HAHN.